(12) United States Patent
Eatwell

(10) Patent No.: US 11,932,368 B2
(45) Date of Patent: *Mar. 19, 2024

(54) EXHAUST SYSTEM

(71) Applicant: COX POWERTRAIN LIMITED, Shoreham-By-Sea (GB)

(72) Inventor: James Eatwell, Shoreham-By-Sea (GB)

(73) Assignee: COX POWERTRAIN LIMITED, Shoreham-By-Sea (GB)

( * ) Notice: Subject to any disclaimer, the term of this patent is extended or adjusted under 35 U.S.C. 154(b) by 439 days.

This patent is subject to a terminal disclaimer.

(21) Appl. No.: 17/132,801

(22) Filed: Dec. 23, 2020

(65) Prior Publication Data

US 2021/0114704 A1 Apr. 22, 2021

Related U.S. Application Data

(63) Continuation of application No. 16/507,374, filed on Jul. 10, 2019, now Pat. No. 10,940,929.

(30) Foreign Application Priority Data

Jul. 12, 2018 (GB) ...................... 1811468

(51) Int. Cl.
*B63H 20/24* (2006.01)

(52) U.S. Cl.
CPC .................. *B63H 20/245* (2013.01)

(58) Field of Classification Search
CPC .................................................. B63H 20/245
See application file for complete search history.

(56) References Cited

U.S. PATENT DOCUMENTS 1,329,559 A * 2/1920 Tesla .................. F15D 1/02
137/842
2,570,509 A * 10/1951 Bandli .................. F02B 61/045
440/89 R (Continued)

FOREIGN PATENT DOCUMENTS

| CN | 1385341 | 12/2002 |
| CN | 1584320 | 2/2005 |

(Continued)

OTHER PUBLICATIONS

U.S. Appl. No. 16/507,374, filed Jul. 10, 2019.

(Continued)

*Primary Examiner* — S. Joseph Morano
*Assistant Examiner* — Jovon E Hayes
(74) *Attorney, Agent, or Firm* — Barnes & Thornburg LLP

(57) ABSTRACT

The present invention relates to an exhaust system for a combustion engine of a marine vessel. The exhaust system includes an exhaust system inlet configured to be coupled to an exhaust gas outlet of the marine engine, one or more exhaust system outlets, and an exhaust gas flow path extending from the inlet to the one or more exhaust system outlets and having a forward flow direction from the exhaust system inlet and a reverse flow direction extending from at least one of the one or more exhaust system outlets. The exhaust system further includes a flow redirection arrangement in the exhaust gas flow path for restricting a flow of liquid flowing in the reverse flow direction, the flow redirection arrangement comprising at least one flow redirection feature configured to redirect a first stream of the liquid toward the forward flow direction to collide with a second stream of the flow of liquid. The invention also relates to motor assemblies and marine vessels having such exhaust systems.

27 Claims, 6 Drawing Sheets

(56) References Cited

U.S. PATENT DOCUMENTS

| | | | | |
|---|---|---|---|---|
| 3,577,952 | A | * | 5/1971 | Tado .................... B63H 20/245 |
| | | | | 440/89 R |
| 4,099,375 | A | * | 7/1978 | Inglee .................... F02K 1/825 |
| | | | | 60/726 |
| 4,326,374 | A | * | 4/1982 | Streb ...................... B63H 21/32 |
| | | | | 440/89 R |
| 5,154,654 | A | * | 10/1992 | Yamazaki ............... F01N 13/12 |
| | | | | 60/314 |
| 5,196,655 | A | * | 3/1993 | Woods ................... F01N 13/16 |
| | | | | 440/89 C |
| 5,262,600 | A | * | 11/1993 | Woods ................. F01N 13/005 |
| | | | | 181/227 |
| 5,366,401 | A | * | 11/1994 | Nanami .................. F01N 13/12 |
| | | | | 60/299 |
| 5,554,057 | A | * | 9/1996 | Abe ..................... B63H 20/245 |
| | | | | 440/89 R |
| 6,802,750 | B2 | | 10/2004 | Hellmann |
| 7,086,370 | B2 | | 8/2006 | Komasawa et al. |
| 9,745,037 | B2 | | 8/2017 | Nakayama et al. |
| 10,239,597 | B2 | | 3/2019 | Davis et al. |
| 10,724,428 | B2 | * | 7/2020 | Dalmas, II ................ F02G 5/02 |
| 2006/0223393 | A1 | * | 10/2006 | Noda ...................... F01N 13/12 |
| | | | | 440/89 R |
| 2020/0017184 | A1 | * | 1/2020 | Eatwell ................. F01N 3/2892 |

FOREIGN PATENT DOCUMENTS

| | | |
|---|---|---|
| CN | 202449197 U | 9/2012 |
| CN | 106005341 | 10/2016 |
| JP | S46-031286 | 10/1971 |
| JP | H06-33753 | 2/1994 |
| JP | 2016-160836 | 9/2016 |
| KR | 10-0822385 | 4/2008 |

OTHER PUBLICATIONS

English Translation of Office Action issued in Appl. No. JP2021-0500731 (dated Jul. 6, 2021).

English Translation of Office Action issued in Appl. No. CN20198046813 (dated Jul. 27, 2021).

Examination Report issued in Appl. No. EP19739370 (dated Oct. 28, 2021).

Combined Search and Examination Report issued in App. No. GB1811468.6 (dated 2018).

Search Report & Written Opinion issued in Int'l App. No. PCT/GB2019/051923 (dated 2018).

* cited by examiner

EXHAUST SYSTEM

CROSS REFERENCE TO RELATED APPLICATIONS

This application is a Continuation of co-pending U.S. patent application Ser. No. 16/507,374, filed Jul. 10, 2019, which claims priority to United Kingdom patent application no. 1811468.6, filed Jul. 12, 2018. The disclosures set forth in the referenced applications are incorporated herein by reference in entirety.

FIELD OF THE INVENTION

The present invention relates to an exhaust system for a marine vessel; and/or to a motor assembly for a marine vessel; and/or to a marine vessel.

BACKGROUND OF THE INVENTION

In order to propel a marine vessel, an outboard motor is often attached to the stern of the vessel. The outboard motor is generally formed of three sections: an upper powerhead including an internal combustion engine; a lower-section including a propeller hub; and a middle section defining an exhaust gas flow path for transporting exhaust gases from the upper section to the lower section.

Such outboard engines typically expel the majority of their exhaust gases underwater through a propeller hub outlet in the lower-section. Additional exhaust gas outlets may also be provided, both beneath the water line and above, through which remaining exhaust gases not expelled through the propeller hub may exit.

When the vessel is stationary, the water level typically lies below the engine. However, when the vessel suddenly moves from forward motion to neutral or reverse, the trailing wave behind the vessel can rapidly reach the outboard motor, which raises the water level within the outboard motor, specifically within the middle section of the outboard motor. Such a rise in water level can also occur when a wave from an external source arrives at the outboard motor, or when a stationary vessel suddenly and quickly reverses. This rise in water level within the middle section can cause problems. On the one hand, a sudden backpressure created in the exhaust flow path can cause the engine to stall. The described phenomena can also potentially result in water entering the internal combustion engine. The described phenomenon of water entering an exhaust outlet of a marine engine can apply equally to inboard marine engines.

The present invention seeks to overcome or at least mitigate one or more problems associated with the prior art.

SUMMARY OF THE INVENTION

According to a first aspect of the invention, there is provided an exhaust system for a combustion engine of a marine vessel, the exhaust system comprising: an exhaust system inlet configured to be coupled to an exhaust gas outlet of the marine combustion engine, one or more exhaust system outlets, an exhaust gas flow path extending from the exhaust system inlet to the one or more exhaust system outlets, the exhaust gas flow path having a forward flow direction from the exhaust system inlet to the one or more exhaust system outlets, and a reverse flow direction extending from at least one of the one or more exhaust system outlets to the exhaust system inlet; and a flow redirection arrangement in the exhaust gas flow path for restricting a flow of liquid flowing in the reverse flow direction, the flow redirection arrangement comprising at least one flow redirection feature configured to redirect a first stream of the liquid towards the forward flow direction to collide with a second stream of the flow of liquid.

Advantageously, restricting and redirecting liquid flowing along the reverse direction reduces the possibility that the liquid will flow out of the exhaust system inlet and into the internal combustion engine. This works to reduce the likelihood of the engine stalling, and/or also reduces the possibility of engine damage occurring due to the influx of liquid into the engine.

The exhaust system is configured to redirect liquid which enters the exhaust system in the reverse direction towards at least one of the one or more exhaust system outlets.

Advantageously, this creates a more tortuous path for liquid flowing to the exhaust system via the one or more outlets, and redirects flow back towards the one or more outlets. This further minimises the likelihood of liquid flowing from the one or more outlets into the internal combustion engine.

The exhaust system may be configured to split liquid which flows in the exhaust system in the reverse direction into a plurality of streams, and to direct at least one of the plurality of streams back towards at least one other of the plurality of streams. The at least one flow redirection feature may be configured to split the flow of liquid into the first and second streams.

Dividing the liquid flow into a plurality of streams and then causing said stream to collide produces turbulence within the liquid flowing in the reverse directions, which dissipates the energy of the incoming reverse flow.

The flow redirection arrangement may be stationary within the exhaust system.

Providing a stationary flow redirection arrangement means that the exhaust system is able to redirect the flow of a liquid flowing in the reverse flow direction toward the forward flow direction without incorporating any moving parts, i.e. a standard non-return valve is not required in the exhaust system.

A chamber may be disposed in the exhaust gas flow path. The at least one flow redirection feature may comprise at least one chamber flow redirection feature located in the chamber. The at least one flow redirection feature is configured to redirect liquid flowing in the reverse flow direction towards at least one of the one or more exhaust system outlets.

Advantageously, this creates a more tortuous path for liquid flowing through the chamber towards the exhaust system inlet (i.e. flowing in a reverse direction along the exhaust flow path), thus reducing the likelihood of liquid flowing in the reverse direction as far as the exhaust system inlet and into the internal combustion chamber.

The at least one chamber flow redirection feature may comprise a first chamber baffle member configured to split the flow of liquid into the first and second streams.

Advantageously, this creates a more tortuous path along the flow path towards the exhaust system inlet, reducing the likelihood of liquid flowing into the internal combustion engine from the exhaust system.

The first chamber baffle member may be a baffle plate.

The first chamber baffle member may be configured to direct the first stream of the flow of liquid to a first side of the baffle member, and to direct the second stream of the flow of liquid to a second side of the baffle member.

The first chamber baffle member may be configured to guide the first stream of the flow of liquid along the first side and past the baffle member, and to direct the second stream of the flow of liquid away from the baffle member. The chamber baffle member may be configured to direct the second stream of the flow of liquid away from the baffle member and substantially sideways relative to the direction of flow of liquid on approach to the baffle member.

The at least one chamber flow redirection feature may further comprise a recessed region defined by a first surface of the chamber. The first chamber baffle member may be configured to guide the first stream into the recessed region, wherein the recessed region is configured to direct the first stream back towards the second stream to collide therewith.

The chamber may comprise an exhaust gas inlet opening and an exhaust gas outlet opening, wherein the axial flow direction through the exhaust gas inlet opening is offset from the axial flow direction through the exhaust gas outlet opening. In such embodiments, the first chamber baffle member is preferably aligned with the axial flow direction through the exhaust gas outlet opening and offset from the axial flow direction through the exhaust gas inlet opening. In this manner, the first chamber baffle member may more readily interact with the flow of liquid flowing in the reverse direction while not presenting a significant obstacle to the flow of exhaust gases in the forward direction.

The chamber may comprise a first surface defining an exhaust gas inlet opening by which the chamber is connected to the exhaust system inlet, and wherein the first chamber baffle member is configured to guide the first stream along the first side away from the exhaust gas inlet opening.

The at least one chamber flow redirection feature may comprise a second chamber baffle member configured to redirect liquid flowing in the reverse flow direction towards at least one of the one or more exhaust system outlets.

Advantageously, this creates a more tortuous path for liquid entering through the one or more exhaust system outlets and flowing in the reverse direction towards the exhaust system inlet.

The chamber may comprise a first surface defining an exhaust gas inlet opening. The second chamber baffle member may be adjacent the exhaust gas inlet opening and may extend substantially away from the first surface.

Providing a second chamber baffle member on the first surface advantageously forms a barrier which prevents liquid from flowing along the first surface and through the inlet opening. The second baffle member effectively forms a recessed region on the first chamber surface, where liquid flowing into the recessed region is redirected away from the inlet opening.

The at least one chamber flow redirection feature may comprise a third chamber baffle member configured to redirect liquid flowing in the reverse flow direction away from the exhaust system inlet.

The chamber may comprise a second surface defining an exhaust gas outlet opening therein. The third baffle member may be adjacent to the exhaust gas outlet opening and may extend substantially away from the second surface.

Advantageously, the third baffle element extends proximate to the outlet opening so as to combine with the wall of the exhaust system housing to form a channel around the outlet opening. This arrangement channels the reverse flowing liquid in a direction away from the exhaust system inlet.

The axial flow direction through the exhaust gas inlet opening may be offset from the axial flow direction through the exhaust gas outlet opening.

The exhaust system may comprise an inlet conduit downstream of the exhaust system inlet along the forward flow direction of the exhaust gas flow path. The at least one flow redirection feature may comprise at least one conduit flow redirection feature in the inlet conduit. In such embodiments, the at least one conduit flow redirection feature may be configured to redirect liquid flowing in the reverse direction along the exhaust gas flow path towards at least one of the one or more exhaust system outlets.

This arrangement further restricts flow towards the exhaust gas inlet, by creating a tortuous path for liquid flowing from the chamber towards the inlet. The flow redirection arrangement may be configured to provide substantially no resistance to exhaust gases flowing in the forward direction along the exhaust gas flow path. Ensuring that no obstructions to the flow of exhaust gases reduces the possibility of pressure drops/differences being present within the exhaust system.

The at least one conduit flow redirection feature may comprise a conduit flow redirection feature formed on an inner wall of the inlet conduit. Providing a flow redirection feature as a component of the conduit wall eases the manufacturing process of the conduit flow redirection feature, and the conduit as a whole.

The conduit flow redirection feature may comprise an array of projections extending away from the inner wall of the inlet conduit. The array of projections may extend away from the inner wall of the inlet conduit in the forward flow direction. This further increases the flow retardation in a reverse direction along the exhaust gas flow path.

The array of projections may be provided on opposing inner walls of the inlet conduit. The array of projections may extend substantially over the entire length of the inner surface of the inlet conduit.

The conduit flow redirection feature may comprise an array of recesses in the inner wall of the inlet conduit. This further restricts liquid flow in a direction towards the inlet. The array of recesses may be provided on opposing inner walls of the inlet conduit. The array of recesses may extend substantially over the entire length of the inner surface of the inlet conduit.

The at least one conduit flow redirection feature may comprise at least one inlet conduit baffle plate provided within the inlet conduit.

The inlet conduit may be removably mounted within the exhaust system. Advantageously, this arrangement allows the inlet conduit to be removed for repair and/or replacement. Additionally, it allows the inlet conduit to be formed from a different material to the rest of the exhaust housing.

According to a second aspect of the invention, there is provided a motor assembly for a marine vessel, the motor assembly comprising: a marine engine defining an exhaust gas outlet; and an exhaust system according to the first aspect, wherein the exhaust system inlet is coupled to the exhaust gas outlet of the marine engine.

According to a third aspect of the invention, there is provided a marine vessel comprising the motor assembly according to the second aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to amend any originally filed claim to depend from and/or incorporate any feature of any other claim even if not originally claimed in that manner.

BRIEF DESCRIPTION OF THE DRAWINGS

Embodiments of the invention will now be described by way of example only with reference to the accompanying drawings, in which.

DETAILED DESCRIPTION OF EMBODIMENT(S)

Figure 1:
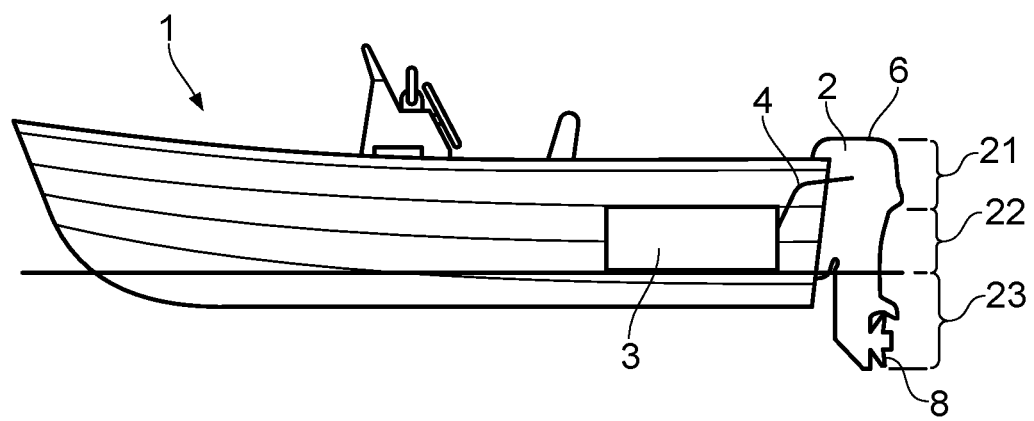
FIG. 1 is a schematic side view of a light marine vessel provided with an outboard motor assembly.

Referring firstly to FIG. 1, there is shown a schematic side view of a marine vessel 1 with an outboard motor 2. The marine vessel 1 may be any kind of vessel suitable for use with an outboard motor, such as a tender or a scuba-diving boat. The outboard motor 2 shown in FIG. 1 is attached to the stern of the vessel 1. The outboard motor 2 is connected to a fuel tank 3, usually received within the hull of the marine vessel 1. Fuel from the reservoir or tank 3 is provided to the outboard motor 2 via a fuel line 4. Fuel line 4 may be a representation for a collective arrangement of one or more filters, low pressure pumps and evaporator tanks (for removing water vapour from the fuel prior to entering the outboard motor 2) arranged between the fuel tank 3 and the outboard motor 2.

As will be described in more detail below, the outboard motor 2 is generally divided into three sections, an upper-section 21, a mid-section 22, and a lower-section 23. A propeller 8 is rotatably arranged on a propeller shaft 9 at the lower-section 23, also known as the gearbox, of the outboard motor 2. Of course, in operation, the propeller 8 is at least partly submerged in water and may be operated at varying rotational speeds to propel the marine vessel 1.

Typically, the outboard motor 2 is pivotally connected to the stern of the marine vessel 1 by means of a pivot pin. Pivotal movement about the pivot pin enables the operator to tilt and trim the outboard motor 2 about a horizontal axis in a manner known in the art. Further, as is well known in the art, the outboard motor 2 is also pivotally mounted to the stern of the marine vessel 1 so as to be able to pivot about a generally upright axis, to steer the marine vessel 1.

Tilting is a movement that raises the outboard motor 2 far enough so that the entire outboard motor 2 is able to be raised completely out of the water. Tilting the outboard motor 2 may be performed with the motor 2 turned off or in neutral. However, in some instances, the outboard motor 2 may be configured to allow limited running of the motor 2 in the tilt range so as to enable operation in shallow waters. Outboard engines are therefore predominantly operated with a longitudinal axis of the leg in a substantially vertical direction. As such, a crankshaft of an engine of the outboard motor which is substantially parallel to a longitudinal axis of the leg of the outboard motor will be generally oriented in a vertical orientation during normal operation of the outboard motor, but may also be oriented in a non-vertical direction under certain operating conditions, in particular when operated on a vessel in shallow water. A crankshaft of an outboard motor which is oriented substantially parallel to a longitudinal axis of the leg of the outboard can also be termed a vertical crankshaft arrangement. A crankshaft of an outboard motor which is oriented substantially perpendicular to a longitudinal axis of the leg of the outboard can also be termed a horizontal crankshaft arrangement.

Figure 2A:
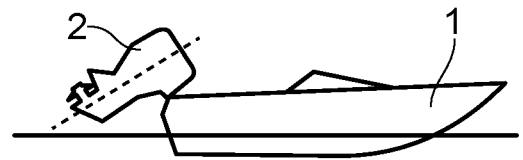
FIG. 2A shows a schematic representation of an outboard motor assembly in its tilted position.

As mentioned previously, to work properly, the lower-section 23 and propeller 8 of the outboard motor 2 needs to extend into the water. In extremely shallow waters, however, or when launching a vessel off a trailer, the lower-section 23 of the outboard motor 2 could drag on the seabed or boat ramp if in the tilted-down position. Tilting the motor 2 into its tilted-up position, such as the position shown in FIG. 2A, prevents such damage to the lower-section 23 and the propeller 8.

Figure 2B:
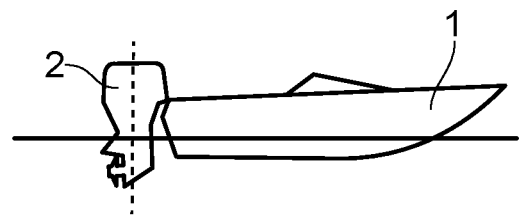
FIGS. 2B to 2D show various trimming positions of the outboard motor assembly and the corresponding orientation of the marine vessel within a body of water.
Figure 2C:
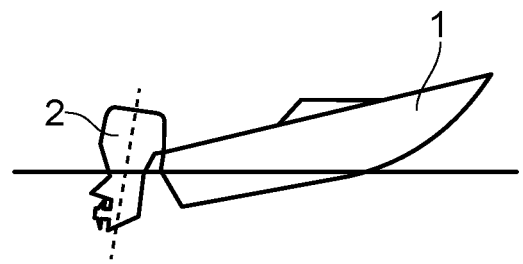
Figure 2D:
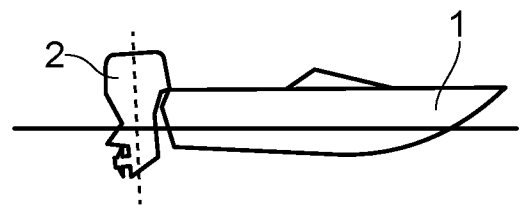

By contrast, trimming is the mechanism that moves the motor 2 over a smaller range from a fully-down position to a few degrees upwards, as shown in the three examples of FIGS. 2B to 2D. Trimming will help to direct the thrust of the propeller 8 in a direction that will provide the best combination of fuel efficiency, acceleration and high speed operation of the corresponding marine vessel 1.

When the vessel 2 is on a plane (i.e. the weight of the vessel 1 is predominantly supported by hydrodynamic lift, rather than hydrostatic lift, a bow-up configuration results in less drag, greater stability and efficiency. This is generally the case when the keel line of the boat or marine vessel 1 is up about three to five degrees, such as shown in FIG. 2B for example.

Too much trim-out puts the bow of the vessel 1 too high in the water, such as the position shown in FIG. 2C. Performance and economy, in this configuration, are decreased because the hull of the vessel 1 is pushing the water and the result is more air drag. Excessive trimming-up can also cause the propeller to ventilate, resulting in further reduced performance. In even more severe cases, the vessel 1 may hop in the water, which could throw the operator and passengers overboard.

Trimming-in will cause the bow of the vessel 1 to be down, which will help accelerate from a standing start. Too much trim-in, shown in FIG. 2D, causes the vessel 1 to "plough" through the water, decreasing fuel economy and making it hard to increase speed. At high speeds, trimming-in may even result in instability of the vessel 1.

Figure 3:
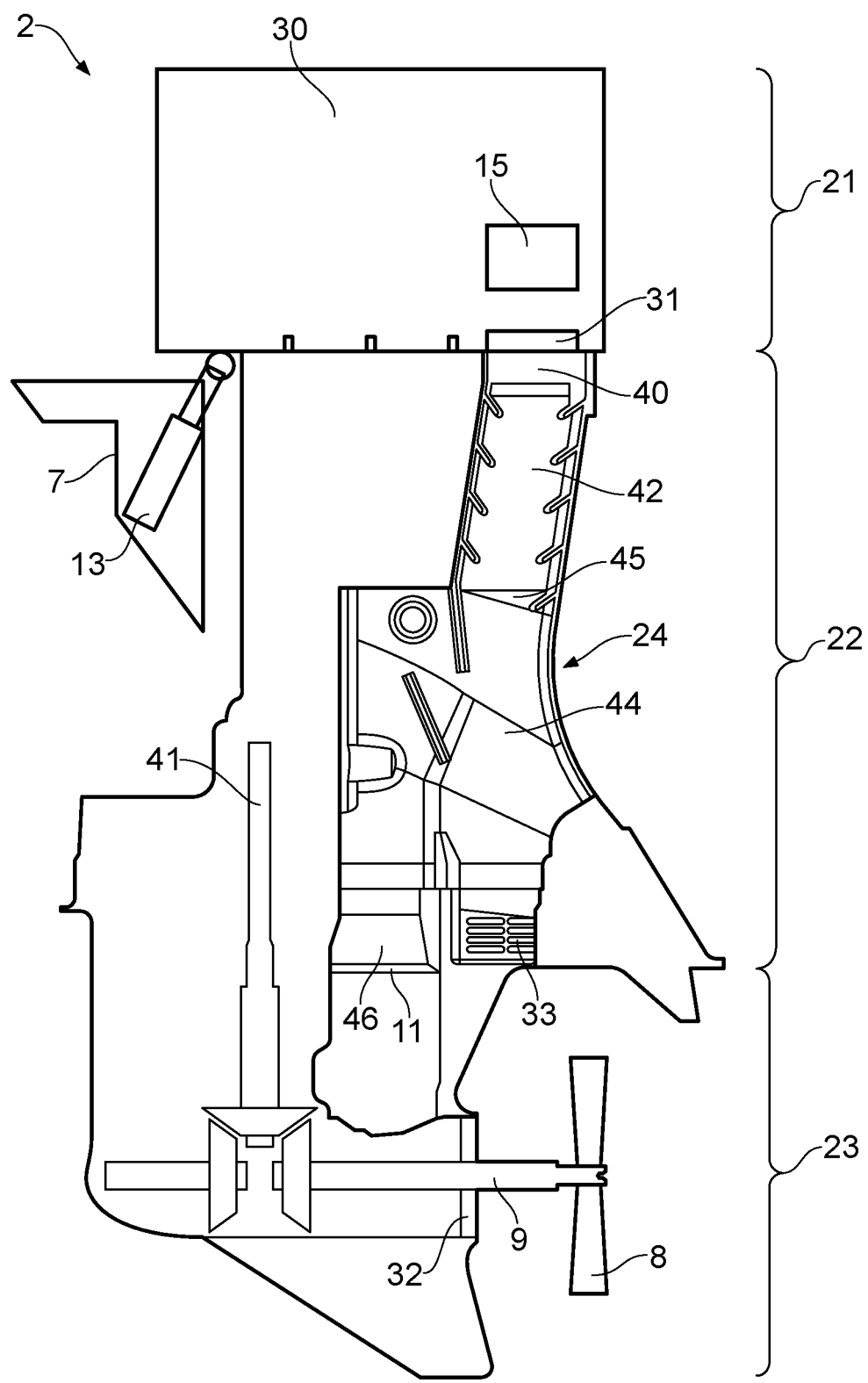
FIG. 3 shows a schematic cross-section of an outboard motor assembly according to an embodiment of the present invention.

Turning to FIG. 3, there is shown a schematic cross-section of an outboard motor assembly 2 including an exhaust system according to an embodiment of the present invention.

The outboard motor 2 comprises a tilt and trim mechanism 7 for performing the aforementioned tilting and trimming operations. In this embodiment, the tilt and trim mechanism 7 includes a hydraulic actuator 13 that can be operated to tilt and trim the outboard motor 2 via an electric control system. Alternatively, it is also feasible to provide a manual tilt and trim mechanism, in which the operator pivots the outboard motor 2 by hand rather than using the hydraulic actuator shown in FIG. 3.

As mentioned above, the outboard motor 2 is generally divided into three sections. An upper-section 21, also known as the powerhead, includes an internal combustion engine 30 for powering the marine vessel 1. Adjacent to, and extending below, the upper-section 21 or powerhead, there is provided a mid-section 22. The lower-section 23 extends adjacent to and below the mid-section 22, and the mid-section 22 connects the upper-section 21 to the lower-section 23. The mid-section 22 houses a drive shaft 41, which extends between the combustion engine 30 and the propeller shaft 9. An anti-ventilation plate 11 prevents surface air from being sucked into the negative pressure side of the propeller 8.

The mid-section 22 and lower-section 23 form exhaust system 24, which defines an exhaust gas flow path for transporting exhaust gasses from the engine outlet 31 of the internal combustion engine 30 towards the lower-section 23.

Specifically, the exhaust system 24 includes an exhaust system inlet 40 coupled to the engine outlet 31 of the internal combustion engine 30. An inlet conduit 42 extends immediately downstream of the exhaust system inlet 40 along the exhaust gas flow path. A downstream end of the conduit 42 flows into a chamber 44 disposed in the exhaust gas flow path via a chamber inlet opening 45. A downstream end of the chamber 44 is coupled with the lower-section 23 via an outlet opening 46. In the exemplary illustrated embodiment, the axial flow direction through the exhaust gas inlet opening 45 is offset from the axial flow direction through the exhaust gas outlet opening 46.

In the exemplary illustrated embodiment, the inlet conduit 42 is removably mounted within the exhaust system 24. This allows the inlet conduit 42 to be removed for maintenance and also allows the inlet conduit 42 to be formed from a different material to the rest of the exhaust system 24. It will be appreciated that, in alternative arrangements, the inlet conduit 42 may be integral with the exhaust system 24.

In addition to accommodating the propeller 8, the exhaust system 24 defines one or more exhaust gas outlets. In the exemplary illustrated embodiment, the lower section 23 provides a first exhaust outlet 32 adjacent to the propeller drive shaft 9. When the propeller 8 is driven by the engine 30 to propel the vessel 1, the negative pressure generated by the propeller 8 draws the exhaust gases through the mid-section 22 towards the first exhaust outlet 32. This arrangement expels the majority of the exhaust gases underwater through the first exhaust outlet 32.

Additional exhaust gas outlets may also be provided, both beneath the water line and above. This enables the remaining exhaust gases not expelled through the propeller exhaust outlet 32 to be expelled from the outboard motor 2. Particularly, provision of the additional exhaust gas outlets enables exhaust gases to be more readily expelled from the outboard motor 2 when there is no negative pressure generated by the propeller 8 (i.e. when the propeller 8 is idle). In the exemplary illustrated embodiment, a second exhaust gas outlet 33 is provided within the mid-section 22. When the vessel is on a plane, as illustrated in FIG. 2B, the second exhaust gas outlet 33 is arranged to be positioned above the water line.

The exhaust gas flow path defines a forward flow direction from the exhaust system inlet 40 to the one or more exhaust system outlets 32, 33, and a reverse flow direction extending from at least one of the one or more exhaust system outlets 32, 33 to the exhaust system inlet 40.

As described above, in some instances, the backpressure crated by waves hitting the outboard motor 2 can result in the introduction of water into the outboard motor 2 via the exhaust gas outlets 32, 33. In turn, this can result in the introduction of water into the internal combustion engine 30.

This can result in stalling of the engine 30. This can be particularly problematic in a situation where turbochargers 15 are positioned closer to a lower downstream end of the engine 30 (i.e. nearer to the engine exhaust outlet 31 and to the resting water level). In these instances in particular, the backpressures and backflows of water in the exhaust system 24 can result in a very hot turbocharger being rapidly cooled, potentially causing structural damage to the turbocharger. In order to alleviate or minimise such problems, the exhaust system 24 is configured to restrict the flow of liquid flowing in a reverse direction along the exhaust gas flow path. Specifically, the exhaust system 24 is configured to redirect at least a portion of liquid flowing in the reverse direction towards the forward direction (i.e. towards at least one of the exhaust system outlets 32, 33), which creates a tortuous path for liquid flowing along the exhaust flow path in the reverse direction. The exhaust system 24 is configured to split liquid which flows in the exhaust system 24 in the reverse direction into a plurality of streams, and to direct at least one of the plurality of streams back towards at least one other of the plurality of streams. The exhaust system has a flow redirection arrangement which is stationary (i.e. fixed) within the exhaust system 24, and a standard (moving) non-return valve is not required in order to restrict/redirect the reverse flow of liquid along the exhaust gas flow path.

Figure 4:
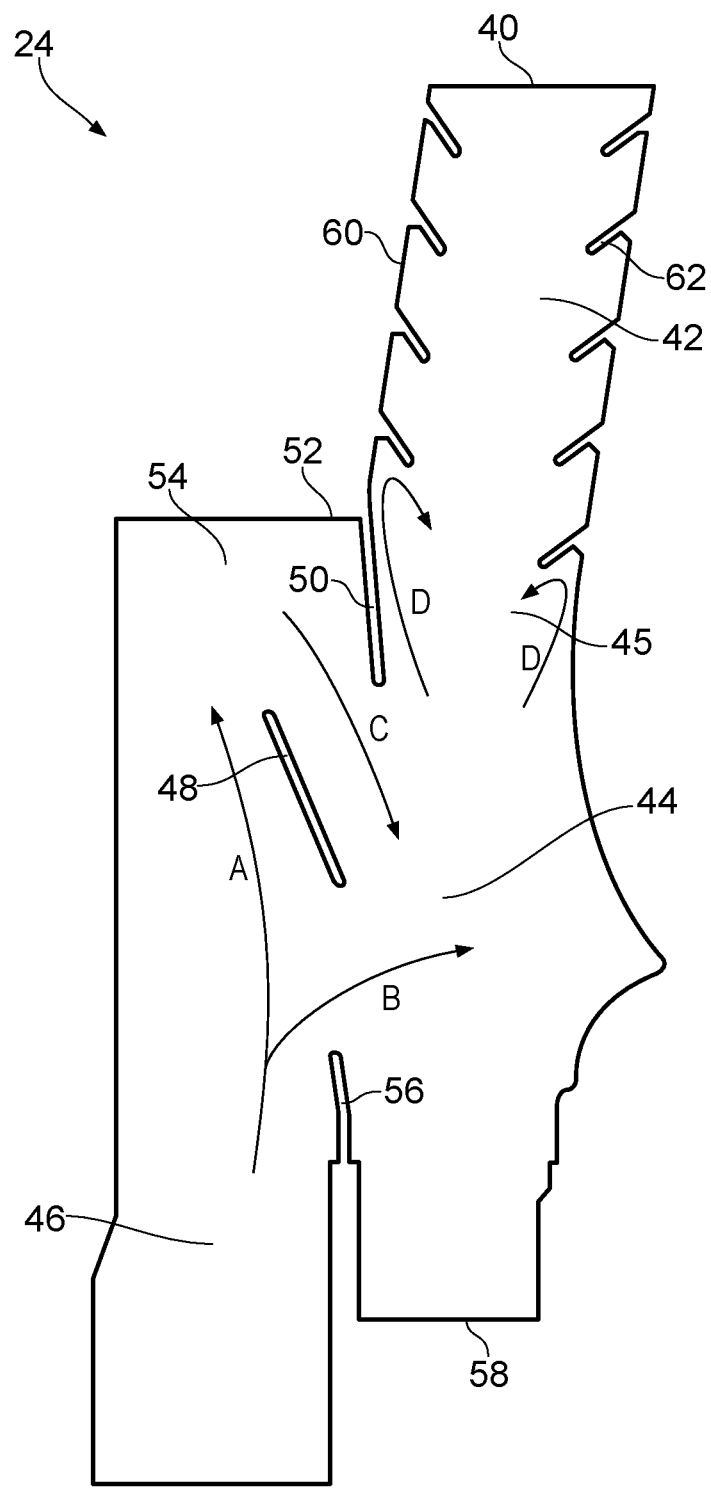
FIG. 4 shows a schematic cross-section of the exhaust system of the outboard motor assembly of FIG. 3.

Turning now to FIG. 4, the exhaust system 24 is illustrated schematically. The chamber 44 is provided with a flow redirection arrangement configured to redirect liquid flowing in the reverse direction along the exhaust gas flow path towards at least one of the exhaust system outlets 32, 33.

The chamber 44, and more specifically, the flow redirection arrangement, includes a chamber flow redirection feature in the form of a first chamber baffle member 48 for restricting the flow of liquid flowing towards the exhaust system inlet 40. As is illustrated in FIG. 4, the first chamber baffle member 48 works to cause a first stream of the liquid flow (indicated by arrow A) to flow to a first side of the baffle member 48, and to cause a second stream of the liquid flow (indicated by arrow B) to flow to a second side of the baffle member 48.

In the exemplary illustrated embodiment, the first chamber baffle member is a baffle plate 48. The baffle plate 48 guides liquid flow A along and past the baffle plate 48, and guides liquid flow B away from the baffle plate 48, substantially sideways relative to the direction of flow of the liquid on approach to the baffle plate 48.

It will be appreciated that, in alternative arrangements, any suitable shape of baffle member may be used, e.g. it may be curved, triangular, round etc. The provision of a baffle member 48 restricts the reverse flow of liquid in the chamber 44 without requiring any moving parts (i.e. the restriction arrangement does not require a typical non-return valve to be fitted in the exhaust system 24).

In the exemplary illustrated embodiment, the flow redirection arrangement includes a second chamber flow redirection feature in the form of a second chamber baffle member 50. The second chamber baffle member 50 is configured such that liquid flowing in a reverse direction along the exhaust gas path is redirected towards at least one of the one or more exhaust system outlets 32, 33.

The second chamber baffle member 50 projects away from (i.e. downwardly) from a first, or upper, surface 52 of the chamber 44. The first surface 52 includes the inlet opening 45. The second chamber baffle member 50 is positioned adjacent the downstream end of the inlet conduit 42 so as to define a downstream extension of the inlet conduit 42. The second chamber baffle member 50 forms a barrier between the inlet conduit 42 and the first surface 52, minimising the flow of liquid along the first surface 52 and through the inlet opening 45.

The second chamber baffle member 50 effectively forms a recessed region 54 on the first chamber surface 52 such that the liquid flow indicated by arrow A flows into the recessed region (i.e. it is redirected away from the inlet opening 45). The liquid flow guided along the baffle plate 48 is thus guided into the recessed region, which further disrupts liquid flow in the reverse direction. The second baffle member 50 then guides the liquid flow in a direction away from the exhaust gas inlet, as indicated by arrow C in FIG. 4. Thus, the fluid flow stream C is directed back towards the stream B to collide therewith. This collision dissipates some of the energy from the liquid flow, and further disrupts the fluid flow in the reverse direction.

Although not illustrated, the recessed region 54 may define a substantially curved surface. A concavely curved surface creates a smooth flow path for the liquid path A, such that the speed of liquid along path C is greater. The increased speed of fluid stream C increases the energy of liquid flow lost in the collision between streams B and C.

In the exemplary illustrated embodiment, the chamber 44 also includes a chamber flow redirection feature in the form of a third chamber baffle member 56. The third chamber baffle member 56 is provided as a projection extending away from a second, or lower, surface 58 of the chamber 44. The third chamber baffle member 56 is positioned adjacent the outlet opening 46 in the second surface 58 so as to form a channel around the outlet opening 46. Upon entering the chamber 44 via the outlet opening 46, the channel guides liquid flowing along the reverse flow path towards the first chamber baffle member 48. This arrangement increases the separation of the two streams, or portions, of the liquid flow.

Providing a flow restriction means in the form of three fixed or stationary chamber baffle members, provides a flow redirection arrangement that does not require any moving parts, e.g. such that a standard non-return valve.

Whilst the exemplary embodiment of the invention has been described as incorporating first, second and third 48, 50, 56 chamber baffle members, it will be appreciated that in alternative arrangements, either one or two of the chamber baffle members 48, 50, 56 may be provided. In further alternative arrangements, the chamber may be provided without any chamber baffle members.

The inlet conduit 42 of the exhaust system 24 is provided with a conduit flow redirection feature configured to restrict liquid flow along the inlet conduit in the reverse direction, and to redirect such liquid towards at least one of the one or more exhaust system outlets 32, 33. Additionally, the conduit flow redirection feature is configured to provide substantially no resistance to exhaust gases flowing along the exhaust gas flow path towards the lower-section 21 of the motor 2. Ensuring that no obstructions to the normal flow of exhaust gases minimises pressure differences within the exhaust system 24.

In the exemplary illustrated embodiment, the conduit flow restriction feature is provided as a conduit flow redirection feature formed on an inner wall 60 of the inlet conduit 42.

The conduit flow redirection feature is provided in the form of an array of projections 62 extending away from opposing inner walls 60 of the inlet conduit 42. Specifically, the array of projections 62 extend away from the inner wall 60 of the inlet conduit in 42 substantially in the forward flow direction. In alternative arrangements, it will be appreciated that the array of projections 62 may only be provided on a single inner wall 60 of the inlet conduit 42.

In the exemplary illustrated embodiment, the array of projections 62 extend substantially over the entire length of the inner surfaces 60 of the inlet conduit 42. In alternative arrangements, the array may only extend over a portion of the length of the conduit 42, or only a single pair of opposing projections 62 may be provided.

The conduit flow redirection feature is fixed within the conduit 42, and is configured to redirect the reverse flow away from the exhaust system inlet 40. As is illustrated by arrows D in FIG. 4, at least a portion of liquid flowing in the reverse direction along the inlet conduit 42 encounter the array of projections 62. The projections 62 cause some of the liquid flow to be redirected both towards the centre of the conduit 42, and towards the outlets 32, 33. It will be appreciated that the redirected liquid flow will collide with any liquid flow that has bypassed the array of projections, thus dissipating the energy of the liquid flow.

The exhaust system 24 also includes an outlet conduit 36 immediately downstream of the chamber outlet opening 46. Although not illustrated, the outlet conduit 36 may be provided with an outlet conduit flow restriction arrangement. It will be appreciated that such a flow redirection arrangement could be provided using any or all of the above flow redirection features described herein. For example, the outlet conduit 36 may include an array of projections (in a similar way to the projections 62 of the inlet conduit 42), and/or an array of recesses on one or more internal walls of the outlet conduit 36 and/or as one or more baffle plates positioned within the outlet conduit 36.

Figure 5:
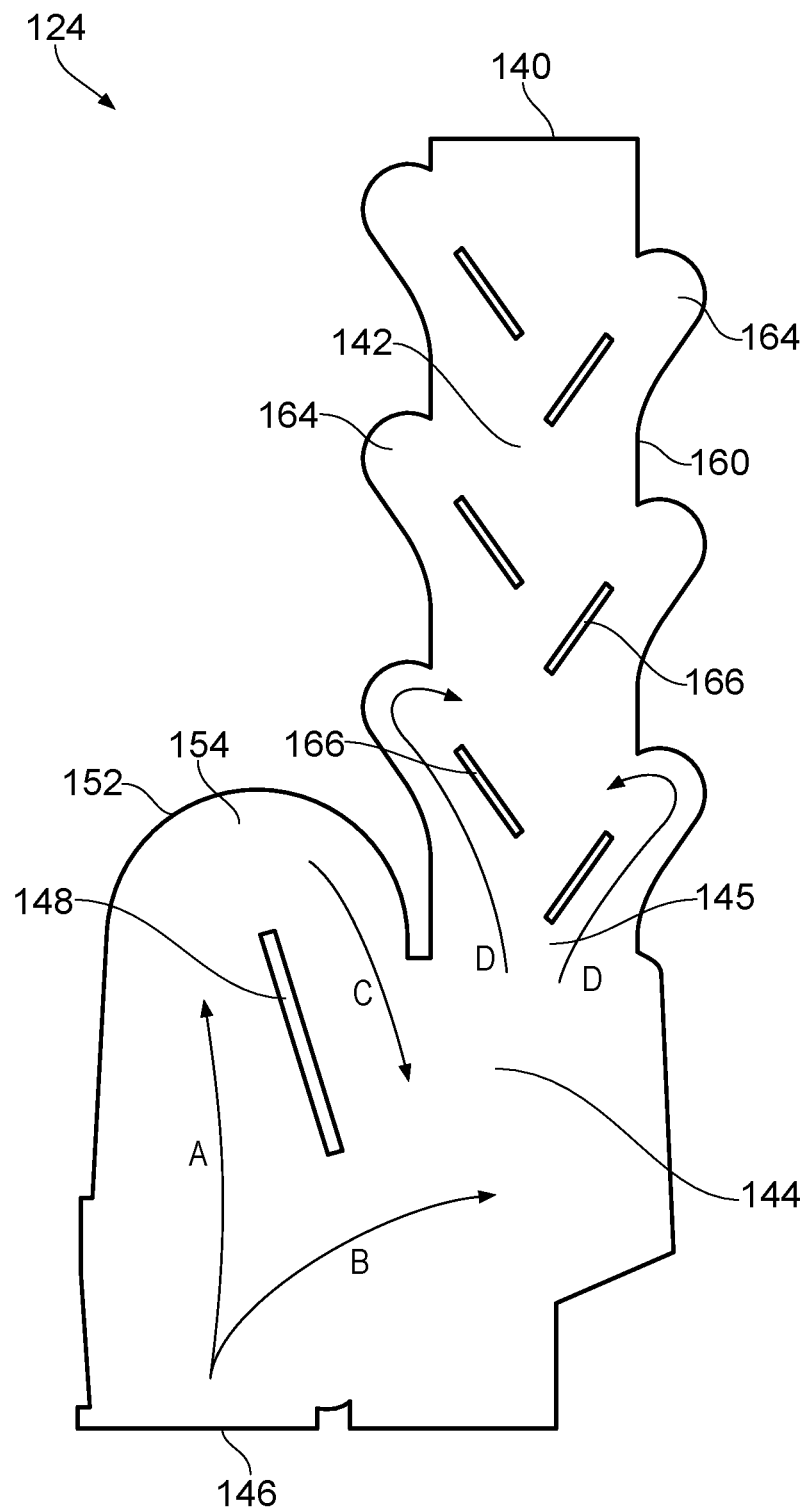
FIG. 5 shows a schematic cross-section of an exhaust system according to an embodiment of the present invention.

Referring now to FIG. 5, an exhaust system 124 according to a further embodiment of the invention is schematically illustrated. Like features with reference to FIGS. 3 and 4 and labelled with the prefix '1', and only differences are discussed.

In the embodiment of FIG. 5, the chamber 144 is not provided with a second chamber baffle member, and instead, the first surface 152 of the chamber 144 is curved. Specifically, the first surface 152 is concavely curved so as to form a recessed region 154. The curved recessed region redirects liquid flowing into the recessed region 154 away from the inlet opening 145.

Additionally, in the arrangement illustrated, the chamber 144 also does not include a third chamber baffle member. Removal of the third chamber baffle member, whilst reducing liquid flow restrictions in the reverse direction, has been found to reduce backpressure of exhaust gases flowing along the exhaust flow path.

The inlet conduit 142 of the exhaust system 124 is provided with a flow redirection arrangement configured to restrict liquid flow along the inlet conduit in a reverse direction (i.e. liquid flowing towards the exhaust inlet 140). In the exemplary illustrated embodiment, the flow redirection arrangement includes a conduit flow redirection feature formed on an inner wall 160 of the inlet conduit 142. The conduit flow redirection feature is provided in the form of an array of recesses 164 in the side wall 160 of the inlet conduit 142. Specifically, the recesses 164 are provided as an array on the opposing internal walls 160 of the inlet conduit 142. In the exemplary illustrated embodiment, the recesses 164 are provided as an alternating array on the opposing internal walls 160 of the inlet conduit 142. In alternative arrangements, it will be appreciated that the array of recesses 164 may only be provided on a single inner wall 160 of the inlet conduit 142.

In the exemplary illustrated embodiment, the array of recesses 164 extend substantially over the entire length of the inner surface 160 of the inlet conduit 142. In alternative arrangements, the array of recesses may extend only over a portion of the length of the conduit 142, or only a single recess 164 may be provided.

The conduit flow redirection arrangement also includes a conduit flow redirection feature in the form of an array of conduit baffle members 166. The conduit baffle members 166 are provided in an array over the length of the conduit 142. In the exemplary illustrated embodiment, the conduit baffle members 166 are provided as an alternating array on the opposing internal walls 160 of the inlet conduit 142. In alternative arrangements, the baffle members may only be provided over a portion of the conduit 142, only on a single internal surface 160 of the conduit 142, or only a single conduit baffle member 166 may be provided.

As has been described in relation to FIG. 4, it will be appreciated that, although not illustrated, the outlet conduit 136 may be provided with a conduit flow restriction arrangement in the form of projections and/or recesses and/or baffle plates in accordance with any of the arrangements described herein.

Figure 6:
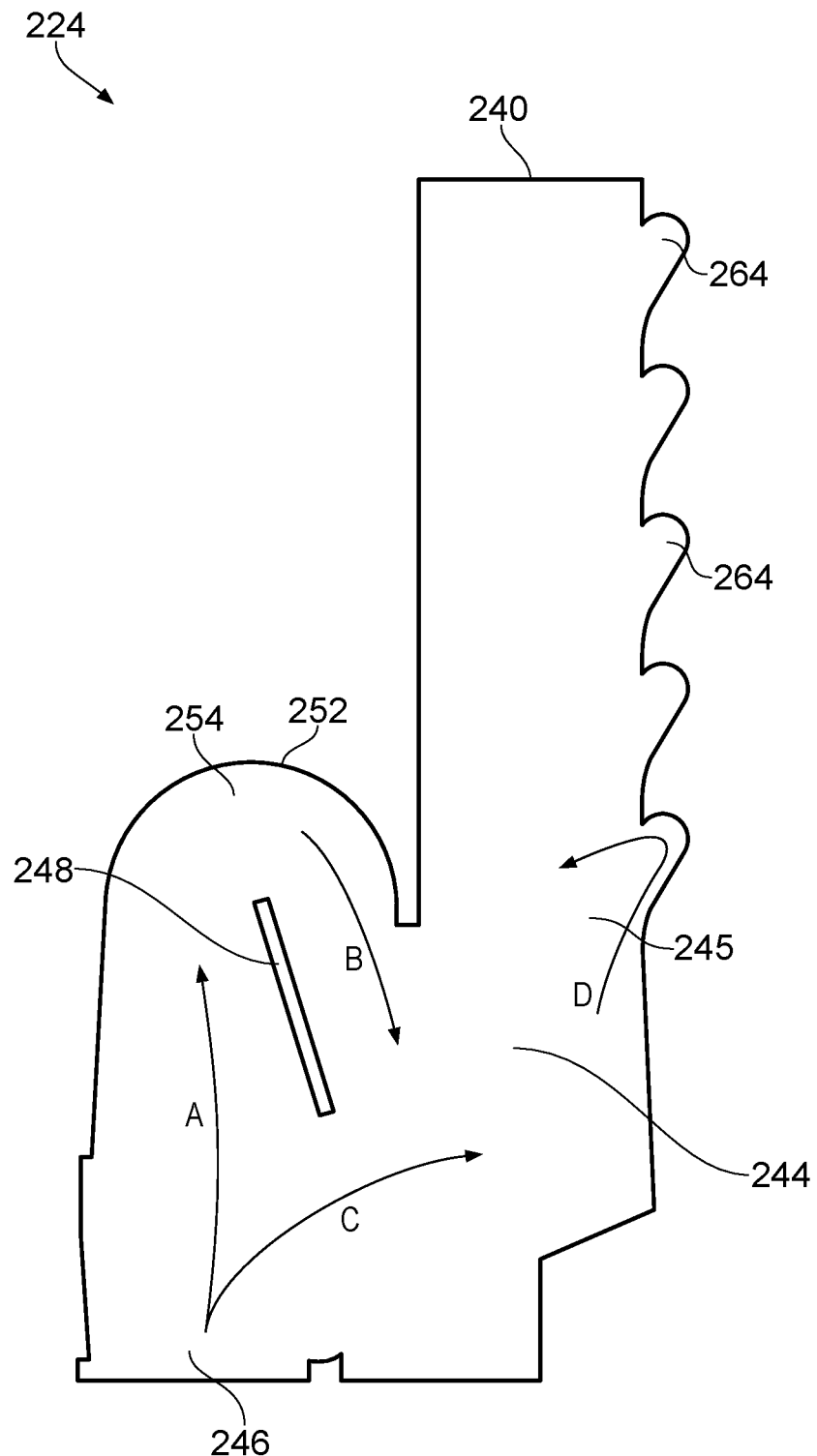
FIG. 6 shows a schematic cross-section of an exhaust system according to an embodiment of the present invention.

Referring now to FIG. 6, an exhaust system 224 according to a further embodiment of the invention is schematically illustrated. Like features with references to FIGS. 3 and 4 and labelled with the prefix '2', and only differences are discussed.

In a similar manner as has been described with reference to the embodiment of FIG. 5, the exhaust system 224 does not include second or third chamber baffle members.

The first surface 252 of the chamber 244 is curved so as to define a recesses region 254 in the first surface 252 of the chamber 244. Specifically, the first surface 252 is concavely curved. Providing a concavely curved surface works to guide/redirect liquid flowing into the recessed region 254 away from the inlet opening 245.

The inlet conduit 242 of the exhaust system 224 is provided with a flow redirection arrangement configured to restrict liquid flow along the inlet conduit in a reverse direction (i.e. liquid flowing towards the exhaust inlet 240). In the exemplary illustrated embodiment, the conduit flow redirection arrangement includes a conduit flow redirection feature formed on an inner wall 260 of the inlet conduit 242. The conduit flow deflection feature is provided in the form of an array of recesses 264 formed in a side wall 260 of the inlet conduit 242.

In the exemplary illustrated embodiment, the array of recesses 264 extend substantially over the entire length of the inner surface 260 of the inlet conduit 242. In alternative arrangements, the recesses 264 may only extend over a portion of the length of the conduit 242, or only a single recess 264 may be provided.

As has been described in relation to FIG. 4, it will be appreciated that, although not illustrated, the outlet conduit 236 may be provided with a flow restriction arrangement in the form of projections and/or recesses and/or baffle plates in accordance with any of the arrangements described herein.

Although the invention has been described above with reference to one or more preferred embodiments, it will be appreciated that various changes or modifications may be made without departing from the scope of the invention as defined in the appended claims.

The present invention may also be described or defined in accordance with the following clauses:

1. An exhaust system for a combustion engine of a marine vessel, the exhaust system comprising:
    an exhaust system inlet configured to be coupled to an exhaust gas outlet of the marine engine, and one or more exhaust system outlets, wherein the exhaust system defines an exhaust gas flow path extending from the exhaust system inlet to the one or more exhaust system outlets, the exhaust gas flow path having a forward flow direction from the exhaust system inlet to the one or more exhaust system outlets, and a reverse flow direction extending from at least one of the one or more exhaust system outlets to the exhaust system inlet;
    wherein the exhaust system comprises at least one flow redirection feature configured to restrict the flow of a liquid flowing in the reverse flow direction by redirecting at least a portion of the liquid toward the forward flow direction.
2. An exhaust system according to clause 1, wherein the exhaust system is configured to redirect liquid which enters the exhaust system in the reverse direction towards at least one of the one or more exhaust system outlets.
3. An exhaust system according to clause 1 or clause 2, wherein the exhaust system is configured to split liquid which flows in the exhaust system in the reverse direction into a plurality of streams, and to direct at least one of the plurality of streams back towards at least one other of the plurality of streams.
4. An exhaust system according to any preceding clause, wherein the flow restriction feature is stationary within the exhaust system.
5. An exhaust system according to any preceding clause, comprising a chamber disposed in the exhaust gas flow path, wherein the chamber comprises the at least one flow redirection feature configured to redirect liquid flowing in the reverse flow direction towards at least one of the one or more exhaust system outlets.
6. An exhaust system according to clause 5, wherein the at least one flow redirection feature comprises a first chamber baffle member configured to restrict the flow of liquid flowing in the reverse direction along the exhaust gas flow path.
7. An exhaust system according to clause 6, wherein the first chamber baffle member is a baffle plate.
8. An exhaust system according to clause 6 or clause 7, wherein the first chamber baffle member is configured to cause a first portion of the liquid flow to flow to a first side of the baffle plate, and to cause a second portion of the liquid flow to flow to a second side of the baffle plate.
9. An exhaust system according to clause 8, wherein the first chamber baffle member is configured such that the first portion of the liquid flow is guided along and past the baffle member, and the second portion of the liquid flow is directed away from the baffle member, substantially sideways relative to the direction of flow of the liquid on approach to the baffle member.
10. An exhaust system according to any one of clauses 6 to 9, wherein the at least one flow redirection feature comprises a second chamber baffle member configured to redirect liquid flowing in the reverse flow direction towards at least one of the one or more exhaust system outlets.
11. An exhaust system according to clause 10, wherein the chamber comprises a first surface defining an exhaust gas inlet opening, and wherein the second chamber baffle member is adjacent the exhaust gas inlet opening and extends substantially away from the first surface.
12. An exhaust system according to any one of clauses 6 to 11, wherein the at least one flow redirection feature comprises a third chamber baffle member configured to redirect liquid flowing in the reverse flow direction away from the exhaust system inlet.

13. An exhaust system according to clause 12, wherein the chamber comprises a second surface defining an exhaust gas outlet opening therein, and wherein the third baffle member is adjacent the exhaust gas outlet opening and extends substantially away from the second surface.

14. An exhaust system according to clause 13 when dependent on clause 11, wherein the axial flow direction through the exhaust gas inlet opening is offset from the axial flow direction through the exhaust gas outlet opening.

15. An exhaust system according to any preceding clause, wherein the exhaust system comprises an inlet conduit downstream of the exhaust system inlet along the forward flow direction of the exhaust gas flow path, and wherein the inlet conduit comprises a flow restriction arrangement configured such that liquid flowing in the reverse direction along the exhaust gas flow path is redirected towards at least one of the one or more exhaust system outlets.

16. An exhaust system according to clause 15, wherein the flow restriction arrangement is configured to provide substantially no resistance to exhaust gases flowing in the forward direction along the exhaust gas flow path.

17. An exhaust system according to clause 15 or 16, wherein the flow restriction arrangement comprises a flow deflection feature formed on an inner wall of the inlet conduit.

18. An exhaust system according to clause 17, wherein the flow deflection feature comprises an array of projections extending away from the inner wall of the inlet conduit.

19. An exhaust system according to clause 18 wherein the array of projections extend away from the inner wall of the inlet conduit in the forward flow direction.

20. An exhaust system according to clause 18 or clause 19, wherein the array of projections is provided on opposing inner walls of the inlet conduit.

21. An exhaust system according to any one of clauses 18 to 20, wherein the array of projections extends substantially over the entire length of the inner surface of the inlet conduit.

22. An exhaust system according to any one of clauses 15 to 21, wherein the flow restriction arrangement comprises an array of recesses in a side wall of the inlet conduit.

23. An exhaust system according to clause 22, wherein the array of recesses is provided on opposing inner walls of the inlet conduit.

24. An exhaust system according to clause 22 or 23, wherein the array of recesses extends substantially over the entire length of the inner surface of the inlet conduit.

25. An exhaust system according to any one of clauses 15 to 24, wherein at least one inlet conduit baffle plate is provided within the inlet conduit.

26. An exhaust system according to any one of clause 15 to 25, wherein the inlet conduit is removably mounted within the exhaust system.

27. An exhaust system according to any preceding clause, comprising a chamber and an outlet conduit downstream of the chamber along the forward flow direction of the exhaust gas flow path, wherein the outlet conduit comprises a flow restriction arrangement configured such that liquid flowing in the reverse direction along the exhaust gas flow path is redirected towards at least one of the one or more exhaust system outlets.

28. An exhaust system according to clause 27, wherein the flow restriction arrangement of the outlet conduit is configured to provide substantially no resistance to exhaust gases flowing in the forward direction along the exhaust gas flow path.

29. An exhaust system according to clause 27 or 28, wherein the flow restriction arrangement comprises a flow deflection feature formed on at least one inner wall of the outlet conduit.

30. An exhaust system according to clause 29, wherein the flow deflection feature comprises an array of projections extending away from the inner wall of the outlet conduit.

31. An exhaust system according to clause 30 wherein the array of projections extend away from the inner wall of the outlet conduit in the forward flow direction.

32. An exhaust system according to clause 30 or 31, wherein the array of projections extends substantially over the entire length of the inner surface of the outlet conduit.

33. An exhaust system according to any one of clauses 27 to 32, wherein the flow restriction arrangement comprises an array of recesses in at least one side wall of the outlet conduit.

34. An exhaust system according to clause 33, wherein the array of recesses extends substantially over the entire length of the inner surface of the outlet conduit.

35. An exhaust system according to any one of clauses 27 to 34, wherein at least one outlet conduit baffle plate is provided within the outlet conduit.

36. A motor assembly for a marine vessel, the motor assembly comprising: a marine engine defining an exhaust gas outlet; and an exhaust system according to any preceding clause, wherein the exhaust system inlet is coupled to the exhaust gas outlet of the marine engine.

37. A marine vessel comprising the motor assembly according to clause 36.

The invention claimed is:

1. An exhaust system for a combustion engine of a marine vessel, the exhaust system comprising:
   an exhaust system inlet configured to be coupled to an exhaust gas outlet of the combustion engine;
   one or more exhaust system outlets;
   an exhaust gas flow path extending from the exhaust system inlet to the one or more exhaust system outlets, the exhaust gas flow path having a forward flow direction from the exhaust system inlet to the one or more exhaust system outlets, and a reverse flow direction extending from at least one of the one or more exhaust system outlets to the exhaust system inlet; and
   a flow redirection arrangement in the exhaust gas flow path for restricting a flow of liquid flowing in the reverse flow direction, the flow redirection arrangement comprising at least one flow redirection feature configured to redirect a first stream of the liquid towards the forward flow direction to collide with a second stream of the flow of liquid.

2. An exhaust system according to claim 1, wherein the at least one flow redirection feature is configured to split the flow of liquid into the first and second streams.

3. An exhaust system according to claim 1, wherein the flow redirection arrangement is stationary within the exhaust system.

4. An exhaust system according to claim 1, comprising a chamber disposed in the exhaust gas flow path, wherein the at least one flow redirection feature comprises at least one chamber flow redirection feature located in the chamber.

5. An exhaust system according to claim 4, wherein the at least one chamber flow redirection feature comprises a first chamber baffle member configured to split the flow of liquid into the first and second streams.

6. An exhaust system according to claim 5, wherein the first chamber baffle member is a baffle plate.

7. An exhaust system according to claim 5, wherein the first chamber baffle member is configured to direct the first stream to a first side of the baffle member, and to direct the second stream to a second side of the baffle member.

8. An exhaust system according to claim 7, wherein the first chamber baffle member is configured to guide the first stream along the first side and past the baffle member, and to direct the second stream away from the baffle member, substantially sideways relative to the direction of flow of the liquid on approach to the baffle member.

9. An exhaust system according to claim 7, wherein the at least one chamber flow redirection feature further comprises a recessed region defined by a first surface of the chamber, wherein the first chamber baffle member is configured to guide the first stream into the recessed region, and wherein the recessed region is configured to direct the first stream back towards the second stream to collide therewith.

10. An exhaust system according to claim 5, wherein the chamber comprises a first surface defining an exhaust gas inlet opening by which the chamber is connected to the exhaust system inlet, and wherein the first chamber baffle member is configured to guide the first stream along the first side away from the exhaust gas inlet opening.

11. An exhaust system according to claim 10, wherein the at least one chamber flow redirection feature comprises a second chamber baffle member adjacent the exhaust gas inlet opening and extending substantially away from the first surface.

12. An exhaust system according to claim 5, wherein the at least one chamber flow redirection feature comprises a third chamber baffle member configured to redirect liquid flowing in the reverse flow direction away from the exhaust system inlet.

13. An exhaust system according to claim 12, wherein the chamber comprises a second surface defining an exhaust gas outlet opening therein, and wherein the third chamber baffle member is adjacent the exhaust gas outlet opening and extends substantially away from the second surface.

14. An exhaust system according to claim 13, wherein the axial flow direction through the exhaust gas inlet opening is offset from the axial flow direction through the exhaust gas outlet opening.

15. An exhaust system according to claim 1, wherein the exhaust system comprises an inlet conduit downstream of the exhaust system inlet along the forward flow direction of the exhaust gas flow path, and wherein the at least one flow redirection feature comprises at least one conduit flow redirection feature in the inlet conduit.

16. An exhaust system according to claim 15, wherein the at least one conduit flow redirection feature comprises a conduit flow redirection feature formed on an inner wall of the inlet conduit.

17. An exhaust system according to claim 16, wherein the conduit flow redirection feature comprises an array of projections extending away from the inner wall of the inlet conduit.

18. An exhaust system according to claim 17 wherein the array of projections extend away from the inner wall of the inlet conduit in the forward flow direction.

19. An exhaust system according to claim 17, wherein the array of projections is provided on opposing inner walls of the inlet conduit.

20. An exhaust system according to claim 17, wherein the array of projections extends substantially over the entire length of the inner surface of the inlet conduit.

21. An exhaust system according to claim 16, wherein the conduit flow redirection feature comprises an array of recesses in the inner wall of the inlet conduit.

22. An exhaust system according to claim 21, wherein the array of recesses is provided on opposing inner walls of the inlet conduit.

23. An exhaust system according to claim 21, wherein the array of recesses extends substantially over the entire length of the inner surface of the inlet conduit.

24. An exhaust system according to claim 15, wherein the at least one conduit flow redirection feature comprises at least one inlet conduit baffle plate provided within the inlet conduit.

25. An exhaust system according to claim 15, wherein the inlet conduit is removably mounted within the exhaust system.

26. A motor assembly for a marine vessel, the motor assembly comprising: a marine engine defining an exhaust gas outlet; and an exhaust system according to claim 1, wherein the exhaust system inlet is coupled to the exhaust gas outlet of the marine engine.

27. A marine vessel comprising the motor assembly according to claim 26.

* * * * *